United States Patent [19]
Miller et al.

[11] Patent Number: 6,069,423
[45] Date of Patent: May 30, 2000

[54] MOTOR COOLING AND SOUND ABSORBING SYSTEM

[75] Inventors: Brent A. Miller, Olmsted Township; Jim Lachendro, Fairview Park; Curt M. Geideman, Oberlin; Richard D. Boozer, Wakeman; Paul K. Foisy, Lorain, all of Ohio

[73] Assignee: Vita-Mix Corporation, Cleveland, Ohio

[21] Appl. No.: 09/296,066

[22] Filed: Apr. 21, 1999

[51] Int. Cl.[7] .................................................. H02K 5/24
[52] U.S. Cl. .................. 310/51; 310/47; 310/50; 310/57; 310/58; 310/62; 310/63; 310/59; 310/89; 310/91
[58] Field of Search ................................ 310/51, 47, 50, 310/57, 58, 62, 63, 59, 89, 91

[56] References Cited

U.S. PATENT DOCUMENTS

| | | | |
|---|---|---|---|
| 3,493,214 | 2/1970 | Edwards et al. | 259/108 |
| 3,548,280 | 12/1970 | Cockroft | 318/443 |
| 3,575,524 | 4/1971 | Adajian | 415/213 |
| 3,866,263 | 2/1975 | Crouser et al. | 15/412 |
| 4,071,789 | 1/1978 | Ernster et al. | 310/50 |
| 4,132,912 | 1/1979 | Wright | 310/62 |
| 4,150,313 | 4/1979 | Panza | 310/51 |
| 5,084,641 | 1/1992 | Saima et al. | 310/51 |
| 5,124,600 | 6/1992 | Hedeen | 310/51 |
| 5,244,275 | 9/1993 | Bauer et al. | 366/314 |
| 5,273,358 | 12/1993 | Byrne et al. | 366/205 |
| 5,453,647 | 9/1995 | Hedeen et al. | 310/51 |
| 5,614,774 | 3/1997 | McCallops et al. | 310/58 |
| 5,866,959 | 2/1999 | Le Flem | 310/51 |

FOREIGN PATENT DOCUMENTS

| | | | |
|---|---|---|---|
| 59-123442 | 7/1984 | Japan | H02K 9/06 |
| 2-179242 | 7/1990 | Japan | H02K 9/06 |

*Primary Examiner*—Nestor Ramirez
*Assistant Examiner*—Thanh Lam
*Attorney, Agent, or Firm*—Renner, Kenner, Greive, Bobak, Taylor & Weber

[57] ABSTRACT

A motor cooling and sound absorbing system includes a housing (10) forming a chamber (13) around a motor (11). The shaft (12) of the motor (11) carries a fan (40) positioned in a chamber (38) formed by a recess (36) cut in a foam block (35). The fan (40) draws air into the chamber (13) through inlet apertures (33) in the housing (10) and this air is directed past the motor (11) to cool it. The air exits the fan (40) generally radially against an angled surface (37) of the recess (36) of the foam block (35). The air is then received in a diffuser passageway (41) defined by the angled surface (37) and an angled surface (42) of a choke plate (19) positioned above the foam block (35). The diffuser passageway (41) reduces the velocity of the air to assist the foam block (35) in absorbing the noise generated thereby, while at the same time reducing the pressure at the exit of the fan (40) to increase the cooling air flow past the motor (11). The air then passes from the diffuser passageway (41) to a plenum chamber (43) located above the foam block (35) and out elongate slots (26) formed in the bottom of the housing (10).

16 Claims, 4 Drawing Sheets

MOTOR COOLING AND SOUND ABSORBING SYSTEM

TECHNICAL FIELD

This invention relates to a system for cooling the motor of an appliance, such as a food blender or the like, with a stream of moving air while at the same time muffling the noise generated by that air and the motor.

BACKGROUND ART

Many devices which are operated by a motor need to be provided with a system for cooling the motor to prevent overheating thereof. Typical of such devices are appliances such as food blenders which may be used in domestic or commercial environments. In these devices, the rotating motor shaft is usually provided with a fan near the bottom thereof which draws cooling air into the motor housing and around the motor for subsequent discharge. However, the movement of this air, as well as the operation of the motor itself, presents a sometimes significant amount of noise which can be an irritant to the user as well as those nearby, such as the customers in a commercial establishment. The faster the air is moving, which is desirable for its cooling effect, the more noise is generated thereby.

As a result, efforts have been directed toward muffling or otherwise reducing the amount of noise generated by the air-cooled motor. One example of such is shown in U.S. Pat. No. 5,273,358. While the device shown in that patent, as well as other muffling devices, do reduce the noise created by the motor and the moving air, they do so at the expense of air flow. That is, in order to reduce the noise, the flow of air past the motor is decreased thereby deterring the cooling effect of the air.

Thus, the need exists for a system which can muffle or otherwise reduce the noise generated by a motor and its cooling air without detriment to the flow of air past the motor and, in fact, muffling the sound while at the same time increasing the air flow.

DISCLOSURE OF THE INVENTION

It is therefore an object of the present invention to provide a system which muffles the sound emanating from a device having an air-cooled motor.

It is another object of the present invention to provide a system, as above, in which the air flow past the motor is increased to enhance the cooling of the motor.

It is a further object of the present invention to provide a system, as above, in which the air is discharged from the fan to a diffuser to lower the exit velocity of the air, thereby reducing the noise generated therefrom.

It is an additional object of the present invention to provide a system, as above, in which one wall defining the diffuser is formed of a sound absorbing material to further reduce the noise.

These and other objects of the present invention, as well as the advantages thereof over existing prior art systems, which will become apparent from the description to follow, are accomplished by the improvements hereinafter described and claimed.

In general, a system which increases the cooling of a motor which operates a device, while at the same time absorbing the noise of the motor and of the moving air cooling the motor, includes a housing for the motor. A motor shaft is adapted to be attached at one end to the device, and its other end carries a fan. Air inlet and air discharge areas are formed in the housing, the fan drawing air into the housing through the inlet area and past the motor. A diffuser receives the air from the fan and reduces the velocity thereof prior to the exit of the air through the discharge area. As a result, the air flow past the motor is increased while at the same time the noise of the air and the motor is reduced.

A preferred exemplary system for cooling a motor with air while at the same time muffling the noise generated by the motor and the moving air, incorporating the concepts of the present invention, is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
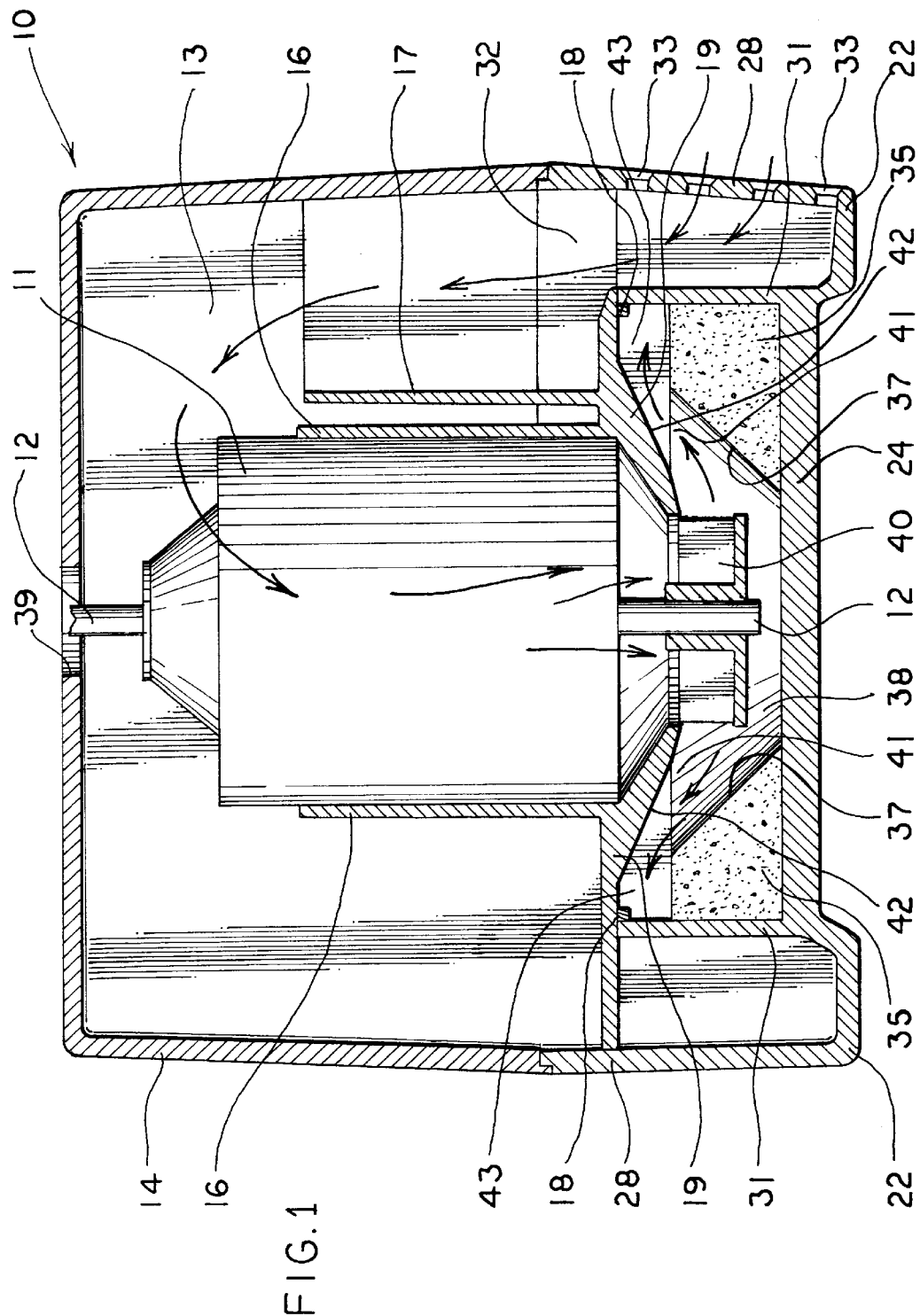
FIG. 1 is a somewhat schematic partial sectional view taken substantially along line 1—1 of FIG. 3 and showing a motor housing having a sound absorption system made in accordance with the present invention.
Figure 2:
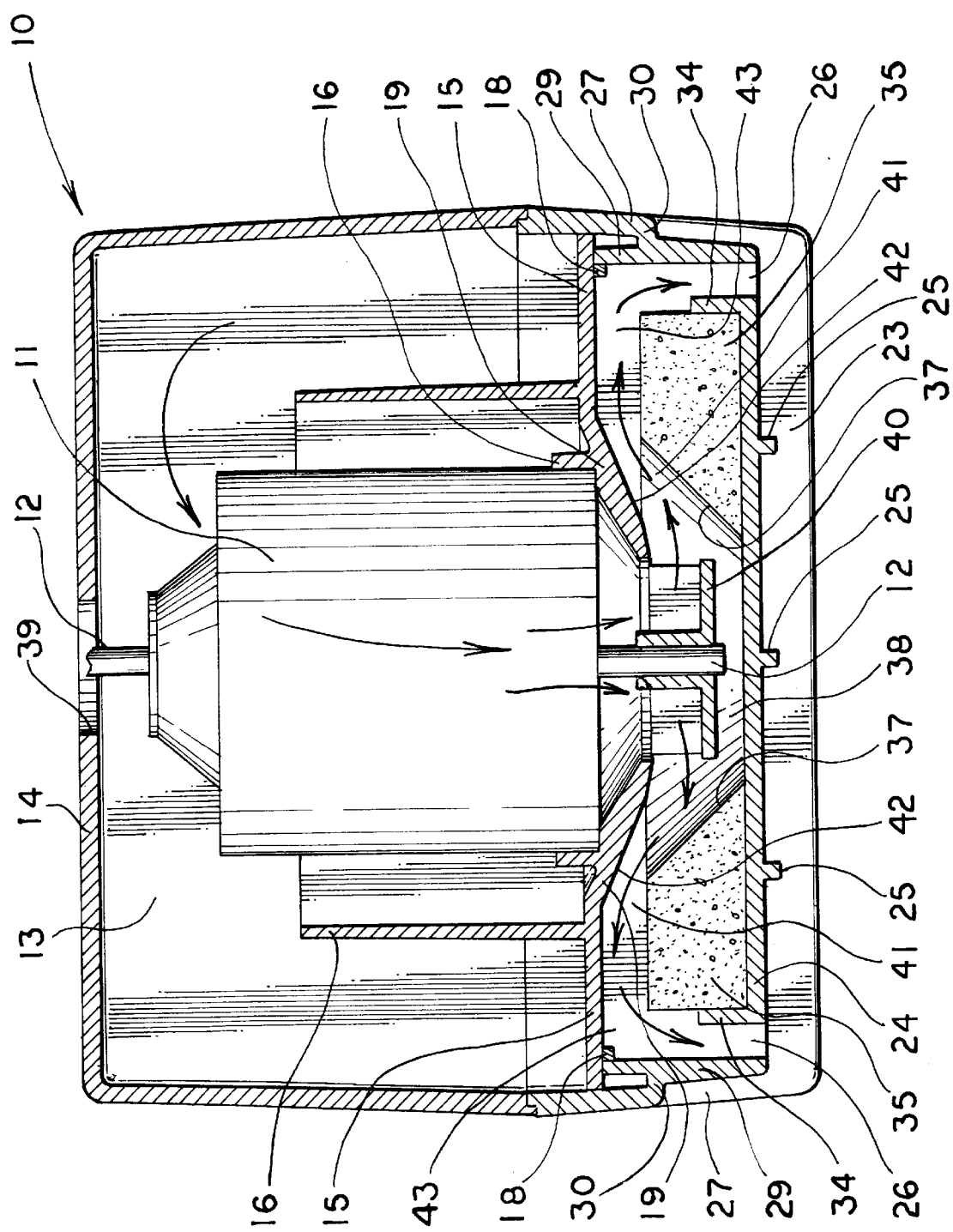
FIG. 2 is a somewhat schematic partial sectional view taken substantially along line 2—2 of FIG. 3.
Figure 4:
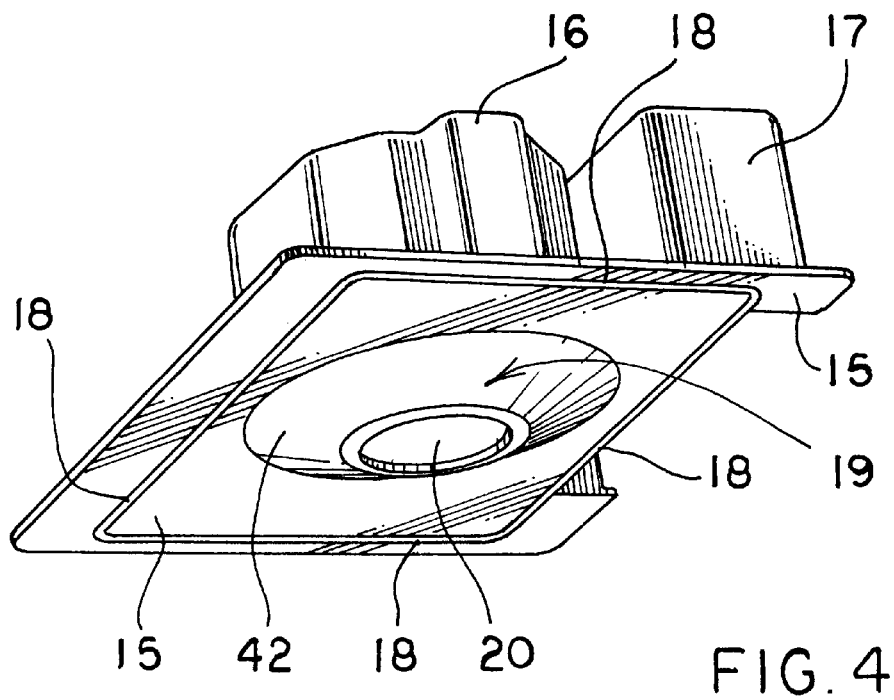
FIG. 4 is a perspective view of a portion of the motor housing component of the present invention including the choke plate component of the diffuser of the sound absorbing system.

The motor housing portion of an appliance, such as a food blender or the like, is indicated generally by the numeral 10 and includes a conventional motor 11 which drives a shaft 12. A chamber 13 is formed for motor 11 and is defined by a top cup-like cover 14 and a base plate 15. As shown in FIGS. 1, 2 and 4, an irregularly-shaped motor casing 16 extends upwardly from plate 15 into chamber 13 and carries motor 11 therein in a conventional manner. An air-receiving chute 17 also extends upwardly from plate 15 which, as will hereinafter be described, receives cooling air and directs it to chamber 13.

As best shown in FIG. 4, the bottom of plate 15 is provided with a small ridge 18 extended downwardly therefrom at generally near or at the periphery of plate 15. A generally cup-shaped choke plate 19 extends downwardly from approximately centrally of plate 15 and is provided with a circular aperture 20 therethrough. The surface of choke plate 19 can be somewhat arcuate or can be linear in configuration, as shown.

Figure 3:
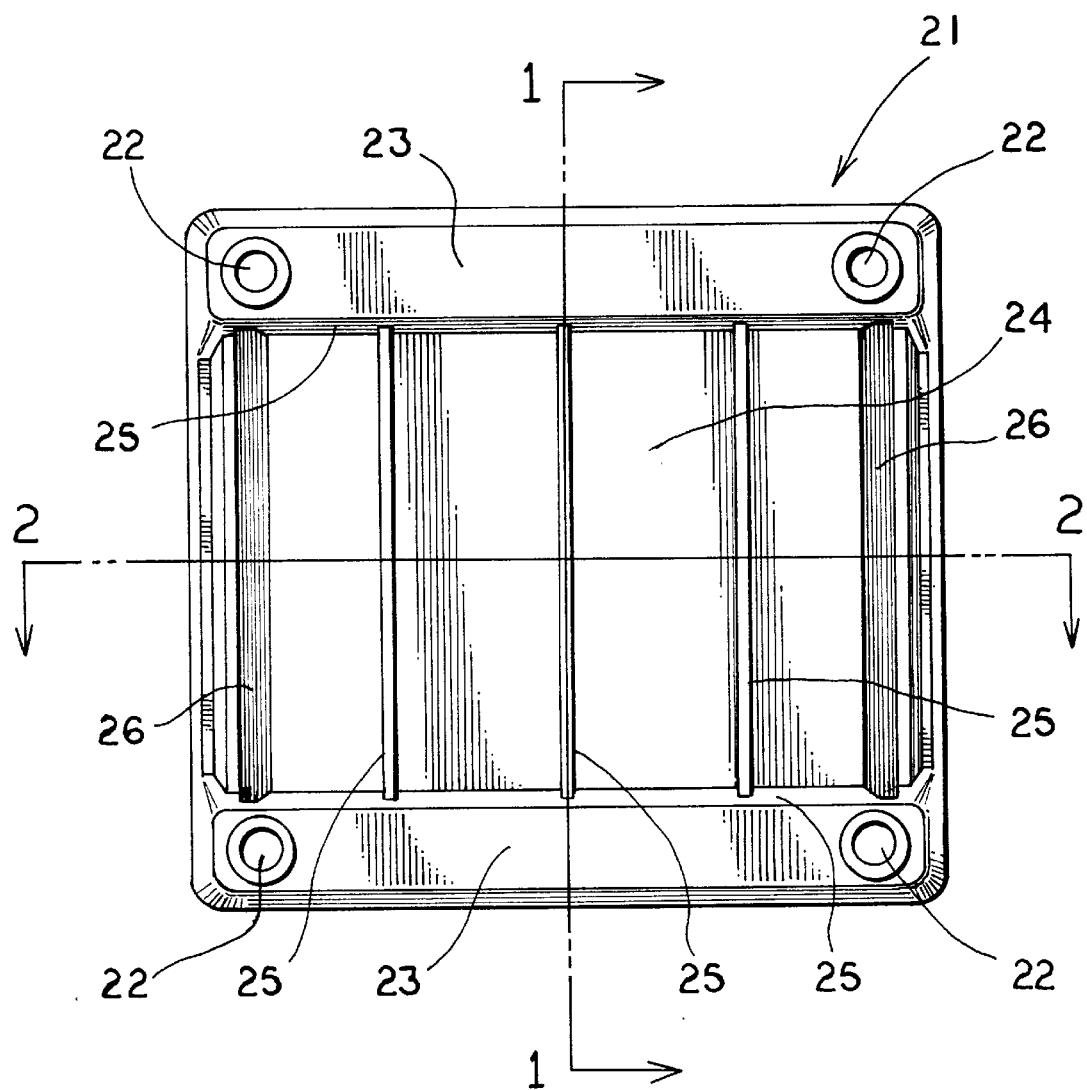
FIG. 3 is a bottom plan view of a motor housing having the sound absorption system made in accordance with the present invention.
Figure 5:
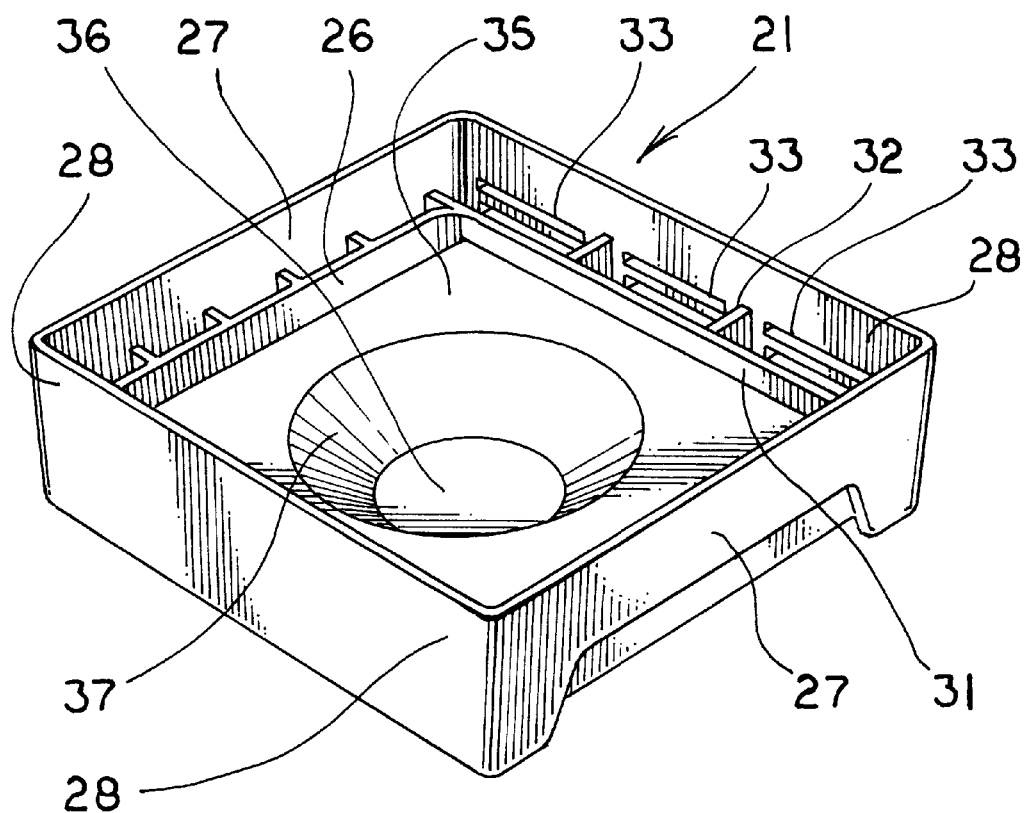
FIG. 5 is a perspective view of a portion of the diffuser component of the sound absorbing system showing a plenum chamber and the sound absorbing material.

As best shown in FIGS. 3 and 5, motor housing 10 includes a base member generally indicated by the numeral 21. Base member 21 includes a plurality of corner feet 22 positioned on opposed support surfaces 23 which elevate a bottom surface 24 off of the table or other support surface upon which the appliance is sitting. Bottom surface 24 is provided with ribbing 25 for structural support, and also has elongate slot apertures 26 extending along opposed sides thereof. As will hereinafter be described in more detail, apertures 26 permit the egress of cooling air from motor housing 10.

Opposed side walls 27 and opposed side walls 28 extend upwardly from support surfaces 23, and their top edges are adapted to engage, by snap fit or other conventional means, the lower peripheral edges of top cover 14. Inner walls 29 are positioned parallel to side walls 27, and are spaced therefrom by support ribbing 30. Inner walls 29 are thus positioned at the side of apertures 26. Similarly, inner walls 31 are positioned parallel to side walls 28 and are spaced therefrom by support ribbing 32. When motor housing 10 is so assembled, that is, with cover 14 on base 21 with plate 15 therebetween, ridge 18 of plate 15 fits within the periphery defined by inner walls 29 and 31 thereby providing a seal between the parts. At least one of the side walls 28 is provided with a plurality of apertures 33 which, as will hereinafter be described in more detail, act as air intake ports for motor housing 10.

A rim 34 (FIG. 2) extends upwardly from bottom surface 24 and is adapted to receive the periphery of, or otherwise locate, an acoustically absorbent material such as open-cell acoustic foam block 35. Block 35 thereby extends in one direction between inner walls 31 and in the other direction between air egress slot apertures 26. A recess 36, preferably in the shape of a truncated cone, is formed generally centrally in block 35. As such, recess 36 defines a circumferentially extending, angular surface 37 for a fan-receiving chamber 38 defined on the bottom by bottom surface 24, on the sides by angular surface 37, and at the top by choke plate 19.

The upper end of motor shaft 12 may extend up through an aperture 39 formed in cover 14 to be attached to the item of an appliance, or the like, to be driven thereby. The lower end of shaft 12 extends into chamber 38 and carries a conventional axial intake, radial discharge fan 40, which is thus positioned within chamber 38 and which has a radial dimension just slightly less than the diameter of aperture 20 in choke plate 19.

When motor 11 is operating to rotate fan 40, outside air is drawn in through ports 33. As shown by the arrows in FIGS. 1 and 2, this air passes upwardly through chute 17, into chamber 13, and is drawn down, around, and through motor 11 to cool motor 11. The air then exits fan 40, generally radially, and encounters the foam block 35 which is surrounding fan 40 and which absorbs the noise generated by both motor 11 and the air. The air then moves into a diffuser passageway 41 defined by angular surface 37 of the foam block 35 and a circumferentially extending, angled surface 42 of choke plate 19. As the air exits diffuser passageway 41, it is received in a plenum chamber 43 positioned above the horizontal upper surface of block 35 where the air spreads out to be thereafter discharged to the atmosphere through slot apertures 26 in bottom surface 24.

As one skilled in the art will appreciate, the presence of diffuser passageway 41 reduces the velocity of the air flow which, coupled with the sound absorbing effect of foam block 35, reduces the noise generated by the system. Moreover, because the air exits from the diffuser passageway 41 to atmospheric pressure through slot apertures 26, the diffuser entrance pressure, that is, the exit pressure of fan 40, is lower than atmospheric pressure. As a result, without needing to change the design of fan 40, air flow past motor 11 is increased. In effect then, the diffuser acts to provide a suction to fan 40 to increase air flow and better cool the motor while at the same time decreasing the exit velocity to minimize noise.

Because the primary flow direction out of fan 40 is radial, the effective passage area in diffuser passageway 41 increases in area even though the space between opposed diffuser surfaces 37 and 42 is shown to be decreasing at the point where the air passes to plenum chamber 43 where, because one side of plenum chamber 43 is defined by foam block 35, even more sound is absorbed.

In light of the foregoing, it should be evident that a motor housing including an improved system for cooling the motor while at the same time absorbing the noise generated by the cooling air, as described herein, substantially improves the art and otherwise accomplishes the objects of the present invention.

What is claimed is:

1. A reduced sound and increased cooling system for a device comprising a housing, a motor within the housing, said motor rotating an axially extending shaft adapted to be connected at one end to a device, a fan carried by the other end of said shaft, an air inlet area formed in said housing, an air discharge area formed in said housing, said fan drawing air into said housing through said air inlet area and past said motor, a diffuser having a passageway, and a choke plate having a surface forming one side of said passageway, said diffuser passageway receiving the air from said fan and reducing the velocity of the air prior to the exit of the air through said discharge area, such that air flow past the motor is increased while at the same time noise of the air and said motor is reduced.

2. A system according to claim 1 further comprising an acoustically absorbent material surrounding said fan, said fan directing air toward said acoustically absorbent material to further reduce the noise.

3. A system according to claim 2 wherein said diffuser passageway is positioned between said fan and said discharge area, the other side of said passageway being defined by a surface of said acoustically absorbent material.

4. A reduced sound and increased cooling system for a device comprising a housing, a motor within the housing, said motor rotating an axially extending shaft adapted to be connected at one end to a device, a fan carried by the other end of said shaft, an air inlet area formed in said housing, an air discharge area formed in said housing, said fan drawing air into said housing through said air inlet area and past said motor, an acoustically absorbent material surrounding said fan, said fan directing air toward said acoustically absorbent material to further reduce the noise, a diffuser including a passageway between said fan and said discharge area, one side of said passageway being defined by a surface of said acoustically absorbent material, and a choke plate positioned above said acoustically absorbent material, said choke plate having a surface forming the other side of said passageway, said diffuser receiving the air from said fan and reducing the velocity of the air prior to the exit of the air through said discharge area, such that air flow past the motor is increased while at the same time noise of the air and said motor is reduced.

5. A system according to claim 4 further comprising a plenum chamber formed between said passageway and said discharge area, said surface of said acoustically absorbent material and said surface of said choke plate converging toward each other as said passageway extends to said plenum chamber.

6. A system according to claim 5 wherein the upper surface of said acoustically absorbent material defines the lower surface of said plenum chamber.

7. A reduced sound and increased cooling system for a device comprising a housing including a base member having a bottom surface and side walls extending upwardly therefrom, an air inlet area including apertures formed in at least one of said side walls, an air discharge area including at least one elongate slot formed in said bottom surface, a motor within the housing, said motor rotating an axially extending shaft adapted to be connected at one end to a device, a fan carried by the other end of said shaft, said fan drawing air into said housing through receiving the air from said fan and reducing the velocity of the air prior to the exit of the air through said discharge area, such that air flow past the motor is increased while at the same time noise of the air and said motor is reduced.

8. A system according to claim 7 wherein said housing includes a motor chamber positioned above said base member, and further comprising a chute to receive air from said air inlet area and direct the air to said chamber.

9. A system according to claim 7 further comprising an acoustically absorbent material carried by said base member adjacent to said at least one elongate slot.

10. A reduced sound and increased cooling system for a device comprising a housing, a motor within the housing, said motor rotating an axially extending shaft adapted to be connected at one end to a device, a fan carried by the other end of said shaft, an acoustically absorbent material having a recess formed therein, said fan being received in said recess, an air inlet area formed in said housing, an air discharge area formed in said housing, said fan drawing air into said housing through said air inlet area and past said motor, and a diffuser, said diffuser receiving the air from said fan and reducing the velocity of the air prior to the exit of the air through said discharge area, such that air flow past the motor is increased while at the same time noise of the air and said motor is reduced.

11. A system according to claim 10 wherein said housing includes a choke plate positioned above said acoustically absorbent material, said choke plate and said recess in said acoustically absorbent material defining a chamber for said fan.

12. A system according to claim 11 wherein said recess in said acoustically absorbent material presents a circumferential angled surface positioned radially of said fan.

13. A system according to claim 12, said choke plate having a circumferential angled surface above said fan and opposed to, and spaced from, said circumferential angled surface of said recess in said acoustically absorbent material.

14. A system according to claim 13 further comprising a plenum chamber formed adjacent to said discharge area.

15. A system according to claim 14 wherein said diffuser is defined by a passageway between said chamber for said acoustically absorbent material and said plenum chamber.

16. A system according to claim 15 wherein said passageway is defined by the space between said circumferential angled surface of said choke plate and said circumferential angled surface of said recess in said acoustically absorbent material.

* * * * *

UNITED STATES PATENT AND TRADEMARK OFFICE
CERTIFICATE OF CORRECTION

PATENT NO.      : 6,069,423
DATED           : May 30, 2000
INVENTOR(S)     : Miller et al.

It is certified that error appears in the above-identified patent and that said Letters Patent are hereby corrected as shown below:

Column 5, line 6, after the word "through" insert --said air inlet area and past said motor, and a diffuser, said diffuser--.

Signed and Sealed this

Fifteenth Day of May, 2001

NICHOLAS P. GODICI

Attest:

Attesting Officer

Acting Director of the United States Patent and Trademark Office